United States Patent [19]

Janssen

[11] Patent Number: 4,499,817

[45] Date of Patent: * Feb. 19, 1985

[54] DISPOSABLE COOKING BAGS

[76] Inventor: Alexander P. Janssen, 28 Old Farm Rd., Bellair, Charlottesville, Va. 22903

[*] Notice: The portion of the term of this patent subsequent to Nov. 1, 2000 has been disclaimed.

[21] Appl. No.: 473,347

[22] Filed: Mar. 8, 1983

Related U.S. Application Data

[60] Division of Ser. No. 139,742, Apr. 14, 1980, Pat. No. 4,412,482, which is a continuation of Ser. No. 702,090, Jul. 2, 1976, abandoned, which is a continuation-in-part of Ser. No. 637,966, Dec. 5, 1975, Pat. No. 4,005,645, which is a continuation-in-part of Ser. No. 327,658, Jan. 29, 1973, Pat. No. 3,946,654.

[51] Int. Cl.$^3$ .............................................. A47G 27/10
[52] U.S. Cl. ........................................ 99/403; 99/407; 99/410
[58] Field of Search ................. 99/295, 327, 403, 410, 99/411, 412, 418, 444, 467; 126/39 M, 373; 229/3.5 MF; 426/113, 412

[56] References Cited

U.S. PATENT DOCUMENTS

| | | |
|---|---|---|
| Re. 27,345 | 4/1972 | Weisberg . |
| 508,831 | 11/1893 | Nicholls . |
| 1,217,818 | 2/1917 | Peterson . |
| 1,281,984 | 10/1918 | Long . |
| 1,566,874 | 12/1925 | Jackson . |
| 1,704,879 | 3/1929 | Bridgham . |
| 2,323,623 | 7/1943 | Porter . |
| 2,807,550 | 9/1957 | Zaratschenzeff . |
| 2,912,336 | 11/1959 | Perino . |
| 2,990,096 | 6/1961 | Crosby . |
| 3,008,837 | 11/1961 | Kaplan . |
| 3,027,261 | 3/1962 | Samara . |
| 3,027,999 | 4/1962 | Heroy, Jr. . |
| 3,088,255 | 5/1963 | Griem . |
| 3,117,875 | 1/1964 | Burns . |
| 3,136,409 | 6/1964 | Schumann . |
| 3,249,285 | 5/1966 | Dollheimer . |
| 3,307,955 | 3/1967 | Prittle . |
| 3,407,077 | 10/1968 | Helin . |
| 3,547,660 | 12/1970 | Weisberg . |
| 3,597,238 | 8/1971 | Scharre . |
| 3,615,711 | 10/1971 | Markus . |
| 3,625,348 | 12/1971 | Titcheral . |
| 3,716,379 | 2/1973 | Perlman . |
| 3,750,873 | 8/1973 | Roman . |
| 3,779,231 | 12/1973 | Anderson . |
| 3,873,735 | 3/1975 | Chalin . |
| 3,935,810 | 2/1976 | Milano . |

FOREIGN PATENT DOCUMENTS

| | | |
|---|---|---|
| 966253 | 1/1964 | United Kingdom . |
| 965498 | 7/1964 | United Kingdom . |
| 1221098 | 2/1971 | United Kingdom . |

Primary Examiner—Harvey C. Hornsby
Assistant Examiner—Arthur D. Dahlberg
Attorney, Agent, or Firm—LeBlanc, Nolan, Shur & Nies

[57] ABSTRACT

Disposable bags in which comestibles can be cooked and subsequently stored, if desired. Provision is preferably made for so attaching the bag to a cooperating utensil or accessory as to facilitate access to the contents of the bag and promote rapid and uniform cooking of the comestibles.

14 Claims, 13 Drawing Figures

DISPOSABLE COOKING BAGS

This application is a division of application Ser. No. 139,742 now U.S. Pat. No. 4,412,482 filed Apr. 14, 1980. application Ser. No. 139,742 is a continuation of application Ser. No. 702,090 filed July 2, 1976 (now abandoned). The latter is a continuation-in-part of application Ser. No. 637,966 filed Dec. 5, 1975 (now U.S. Pat. No. 4,005,645) which, in turn, is a continuation-in-part of application Ser. No. 327,658 filed Jan. 29, 1973 (now U.S. Pat. No. 3,946,654).

The present invention relates to novel, improved, disposable bags for cooking comestibles.

My earlier filed application Ser. Nos. 327,658 and 637,966 disclose novel cooking utensils intended to be used in many, if not most, instances with a disposable bag in which the comestibles are contained during the cooking process and novel accessories for giving conventional utensils the same capabilities as the utensils specifically designed for use with disposable bags.

In cooking comestibles by the techniques described in the foregoing applications the bag is surrounded by a cooking medium for transferring heat to its contents during the cooking cycle. The cooking medium will typically be water in the case of stovetop cookery and air for oven cookery.

Cooking in disposable bags as just described has a number of important advantages. First, this permits comestibles to be cooked in their own juices. The natural taste of the food is preserved and the loss of nutritional values which occurs when foods are cooked in water is avoided along with the mushy or waterlogged texture which commonly results.

Another virtue is that the utensil is not soiled during the cooking process. Thus, the inconvenience of cleaning the utensil after it is used is eliminated; only rinsing and drying are required.

Furthermore, the bag in which the comestibles are cooked can be used to store them. This is a particular convenience if the bag is stored in a refrigerator container or the like as the latter will not become soiled.

Furthermore, the novel utensils and accessories described in my earlier applications keep the bag and the comestibles contained in it submersed in the cooking medium when comestibles which would otherwise float are being cooked. This results in heat being conducted uniformly to the comestibles from all directions and, typically, at a higher temperature than it would be if the bag and its contents were allowed to float in the cooking medium. As a consequence, the comestibles are cooked more quickly and more uniformly.

Particularly useful embodiments of my previously disclosed inventions have an arrangement for detachably securing the lower corners of the bag in place. This produces two important advantages First, this keeps the bag from being buoyed upwardly in a liquid cooking medium and, also, permits the cooking medium to more effectively collapse the bag against the comestibles. The result is that the bag is more uniformly surrounded by the cooking medium, producing more efficient and uniform cooking of the comestibles.

Second, by securing the lower end of the bag in place, corners are eliminated and a rounded, more open shape is given to the lower end of the bag. This significantly facilitates access to the comestibles in the bag and removal of the comestibles from the bag.

Parent application Ser. No. 637,966 discloses a disposable bag construction designed for use with accessories and utensils having the feature just discussed and, more particularly, a novel bag construction which facilitates the attaching of the bag to the accessory. At the same time these bags can be economically manufactured so that the added convenience can be inexpensively obtained.

I have now invented other novel disposable bag constructions which also facilitate attachment to a utensil or accessory designed to secure the lower end of the bag in place. These, too, are inexpensive to manufacture and may accordingly be disposed of once they have served their purpose.

Certain of the accessories and utensils disclosed in my earlier filed applications are equipped with a series of inwardly extending elements pivotably fixed to an associated base at their outer ends. These elements are concomitantly movable between: (a) an open position in which the inner ends of the elements are rotated upwardly and outwardly to spread open a disposable bag attached to the inner ends as by clips or prongs and furnish access to its contents; and (b) a closed position in which the pivotable elements are rotated inwardly and downwardly.

In the closed position the pivotable elements secure the upper end of the bag in a manner that will allow gases and vapors evolved from the comestibles to escape while keeping the cooking medium from entering the bag. This permits the bag to collapse against its contents, considerably increasing the efficiency with which heat is transferred to the comestibles; it also maximizes the uniformity with which heat is transferred to the comestibles from different directions. Furthermore, by permitting gases and vapors to escape, the tendency of the bag to float is minimized as is the possibility of the bag rupturing due to a build-up of internal pressure.

I have now discovered that the fasteners used to secure the upper end of the bag to the pivotable elements are not essential and that the upper end of the bag can instead be lapped over the inner ends of the pivotable elements and secured to the base of the utensil or accessory. Or, pockets can be formed in the upper ends of the bag and the inner ends of the pivotable elements inserted in these to form connections similar to those afforded by clips or prongs. Accessories and utensils of these types are disclosed in my application Ser. No. 702,002 filed July 2, 1976, which was copending with parent application Ser. No. 139,742.

I have now also invented novel disposable bag constructions especially suited for use with the accessories disclosed in application Ser. No. 702,002. These constructions may also be made so that the lower end of the bag can be secured in place for the purposes and in the manner discussed above. Again, inexpensive manufacture is a hallmark, permitting the bag to be disposed of following use.

Disposable bags for cooking comestibles are as such not new as shown by U.S. Pat. Nos. 2,323,623 issued July 6, 1943, to Porter; 2,912,336 issued Nov. 10, 1959, to Perino; 3,008,837 issued Nov. 14, 1961, to Kaplan; 3,027,261 issued Mar. 27, 1962, to Samara; 3,088,255 issued May 7, 1963, to Griem; 3,117,875 issued Jan. 14, 1964, to Burns; 3,547,660 issued Dec. 15, 1970, to Weisberg; 3,615,711 issued Oct. 26, 1971, to Markus et al; 3,716,369 issued Feb. 13, 1973, to Perlman; 3,750,873 issued Aug. 7, 1973, to Roman; and 3,935,810 issued Feb. 3, 1976, to Milano; British Patent Specification No. 965,498 published July 29, 1964; the Drackett Products Co. pamphlet entitled "How to Use Cooking Magic Bags" copyrighted in 1971; and the Sears recipe and instruction book entitled "Meals in Minutes". However, none of the foregoing are relevant to the present invention as none discloses bags which are suitable for use with cooking utensils or accessories having the capabilities described above.

From the foregoing it will be apparent to the reader that one primary object of the present invention resides in the provision of novel, improved, disposable bags for cooking comestibles.

A second, primary object of the invention resides in the provision of disposable bags in accord with the preceding object which are especially suited for use with cooking utensils and cooking utensil accessories employing the principles of those disclosed in application Ser. Nos. 637,966 and 702,002 and in U.S. Pat. No. 3,946,654.

Another important and primary object of the invention resides in the provision of disposable bags in accord with the preceding objects which can be inexpensively manufactured.

A further important and primary object of the invention is the provision of disposable bags for cooking comestibles so constructed as to provide rapid and uniform cooking of, and ready access to, their contents.

Other objects and features and further advantages of the present invention will be apparent from the appended claims and as the ensuing detailed description and discussion proceeds in conjunction with the accompanying drawing, in which:

FIG. 1 is a side view of a cooking utensil accessory to which has been attached a disposable cooking bag embodying the principles of the present invention;

FIG. 2 is a plan view of the accessory;

Figure 3:
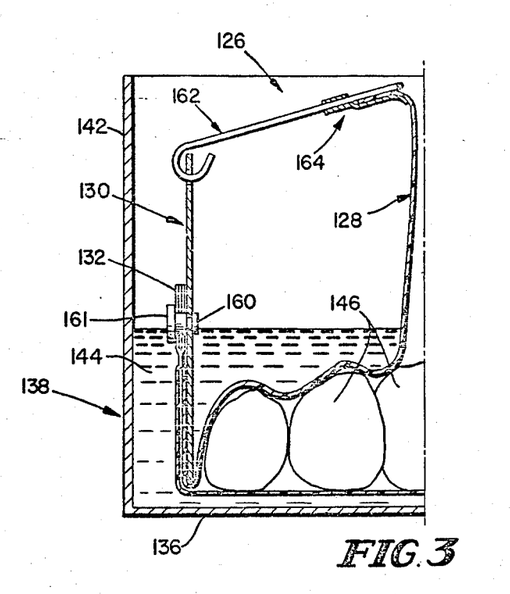
FIG. 3 is a vertical half section through the accessory and the vertical bag.

Referring now to the drawing, FIGS. 1–3 depict an accessory 126 adapted to be used in conjunction with a conventional cooking utensil and disposable bags embodying the principles of the present invention to cook comestibles in the manner discussed above. In accessory 126 provision is made for stretching the lower end of the disposable cooking bag 128 across the lower end of the accessory base 130 and then securing the lower corners 132 of the bag to base 130 to keep it taut. As discussed previously, this eliminates the corners, facilitating the removal of comestibles from bag 128. Also, the lower end of the bag and its contents are kept from floating upwardly, promoting rapid and uniform cooking of the comestibles.

The base 130 of attachment 126 can be made from sheet metal, for example. Legs 134 fixed to the base as by riveting support the base from the bottom wall 136 of the pan 138 (see FIG. 3) with which attachment 126 is employed. Spring arms 140, integral with legs 134, engage the vessel side walls 142 and center attachment 126 in the vessel. By virtue of this and the supporting of the base in spaced relation to bottom wall 136 of the pan, free circulation of the cooking medium 144 to promote uniform cooking of the comestibles 146 in bag 128 is provided.

It is preferred that buffers 147 of a softer material be fixed to the upper, distal ends of spring arms 140 to keep the spring arms from marring the pan. This is particularly important if the pan is lined with a Teflon or other easily damaged material.

Figure 4:
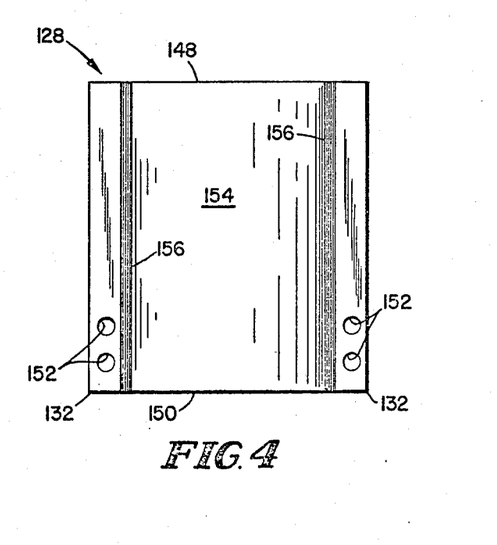
FIG. 4 is a side view of the disposable bag.

FIG. 4 depicts in more detail the disposable bag 128 designed for use with cooking utensils and accessories having the characteristics of the accessory illustrated in FIGS. 1–3.

Bag 128 is of single fold construction and has a rectangular configuration with an open upper end 148 and a closed lower end 150. Holes or apertures 152 are formed through the bag adjacent its lower end and adjacent the two edges of the bag. Inwardly of these apertures, the two sides 154 of the bag (only one of which is shown) are sealed together by seams 156 to prevent leakage through the apertures.

Bag 128 is secured to the base 130 of attachment 126 by stretching its closed end across the lower edge 158 of the base and then hooking the lower corners 132 of the bag over outwardly projecting studs 160 fixed to base 130, the studs extending through holes 152 in the bag. Two diametrically opposed studs 160 are employed, one for each of the two corners 132 of the bag.

Studs 160 preferably have enlarged heads 161 over which the bag is stretched. The bag then relaxes to its original configuration so that the enlarged heads of the studs keep the corners of the bag in place.

The upper end 148 of the disposable cooking bag is attached to the inner ends of pivotable bag supporting elements 162 by clips 164 of sheet metal construction. The clips have a spring portion 166 held against the necked down, distal end portions 168 of the pivotable elements 162 with which they are associated by retainer portions 170 at the outer ends of the clips. The retainer portions are bent around the legs 172 and 174 of the pivotable elements to secure the clips in place.

The upper edge of the disposable bag 128 is slipped between the spring portions 166 of the clips and the necked down portions 168 of the pivotable elements, permitting spring portions 166 to clamp the bag against the distal ends of the pivotable elements. The ends of the spring portions 166 into which the bag edge is inserted are preferably curved outwardly to facilitate insertion of the bag.

It is not necesary in the attachments described herein that there be bag engageable elements at the inner ends of all of the concomitantly pivotal members. In attachment 126, for example, the pivotable members 162 bearing bag engaging spring clips 164 are alternated with pivotable elements 176 having truncated legs 178 and 180 connected by an integral, lateral leg 182. The pivotable elements 162 and 176 are assembled with the left-hand leg of each element 162 or 176 lying under the right-hand leg of the element to its left and the right-hand leg overlying the left-hand leg of the element to its right so that all of the pivotable elements 162 and 176 will move in unison.

In one actual embodiment of my invention intended for use with a three-quart saucepan, there are six elements of the character identified by reference character 162 in FIG. 2. There are five pivotable elements of the character identified by reference character 176. The place of the sixth element of the latter type is taken by the pivotable member 186 of a retainer or toggle mechanism 188.

Toggle mechanism 188 also includes a vertically extending spring 190 fixed, at its lower end, to attachment base 130. At its upper, free end, the spring terminates in a downwardly opening loop or hook 194.

Member 186 of the toggle mechanism has inwardly extending, outer legs 196 and 198 by which the member is pivotally attached to base 130 in the same manner as the various pivotable elements described previously. Integral with the outer legs are two inner legs 200 and 202 connected by a transversely extending leg 204 at their lower and outer end.

The configuration just described produces two generally V-shaped sections 206 and 208 defined by legs 196 and 200 and by legs 198 and 202, the two legs in each section being connected at their distal ends. A fastener 210 inserted through the two V-shaped sections 206 and 208 at these ends fixes the two sections of the member together with the end of one section behind the other. The laterally acting spring tension of the two sections and heads 212 on the fastener keep the latter in place.

The outer, left-hand leg 196 of member 186 lies under the right-hand leg 174 of the bag-supporting element 162 to its left; and the right-hand leg 198 of the member overlies the left-hand leg 172 of the element 162 to its right. Accordingly, member 186 pivots concomitantly with the bag-supporting elements 162 and the associated pivotable elements 176.

When the bag-supporting elements 162 are rotated upwardly and outwardly to spread the open end of bag 128, element 186 is displaced to a generally vertical position. In this position the lower end portions of inner legs 200 and 202 are confined between spring 190 of the toggle mechanism and the base 130 of the attachment, maintaining pivotal member 186 in the illustrated position. Because of the interconnection between it and the pivotable elements 162 and 176 discussed above, bag-supporting elements 162 are locked in an open position with the open end of the bag spread.

When the pivotal elements 162 and 176 are displaced from the open position to the closed position shown in FIG. 2 to close the open end of bag 128 and to collapse it around comestibles 146, the transversely extending leg 204 of toggle mechanism member 186 moves upwardly until it bottoms in the loop 194 at the upper end of spring 190; and legs 200 and 202 of the member engage the upper edge 214 of base 130. This precludes further downward movement of element 186, bag-supporting elements 162, and elements 176.

This limiting of the downward movement of bag-supporting elements 162 is important because it permits bag 128 to collapse around the comestibles 146 in a manner which insures uniform and efficient cooking of the comestibles and keeps the cooking medium from flowing into the bag in those applications where liquid is employed.

Also, this keeps the various elements 162, 176, and 186 from pivoting downwardly to the extent that the element attaching loops at their outer ends can become unhooked from attachment base 130.

Attachment 126 also has a latch 222 of sheet metal construction. At one end it is pivotally mounted on the transverse leg 182 of one element 176.

Subsequent portions of the latch extend upwardly, horizontally, and downwardly to clear the inner ends of pivotable members 162. These are followed by a hook portion 226 which is engageable with the transverse leg 182 of the element 176 facing that to which the latch is connected to hold the two elements 176 in the illustrated positions. As these two elements are interconnected with the remaining pivotable elements in the manner described previously, the latter are likewise held closed.

At its free end, the latch terminates in a handle portion 228 by which the latch can be released and engaged.

Accessory 126 is described and illustrated in more detail in parent application Ser. No. 637,966 to which the reader may refer if he wishes.

Figure 5:
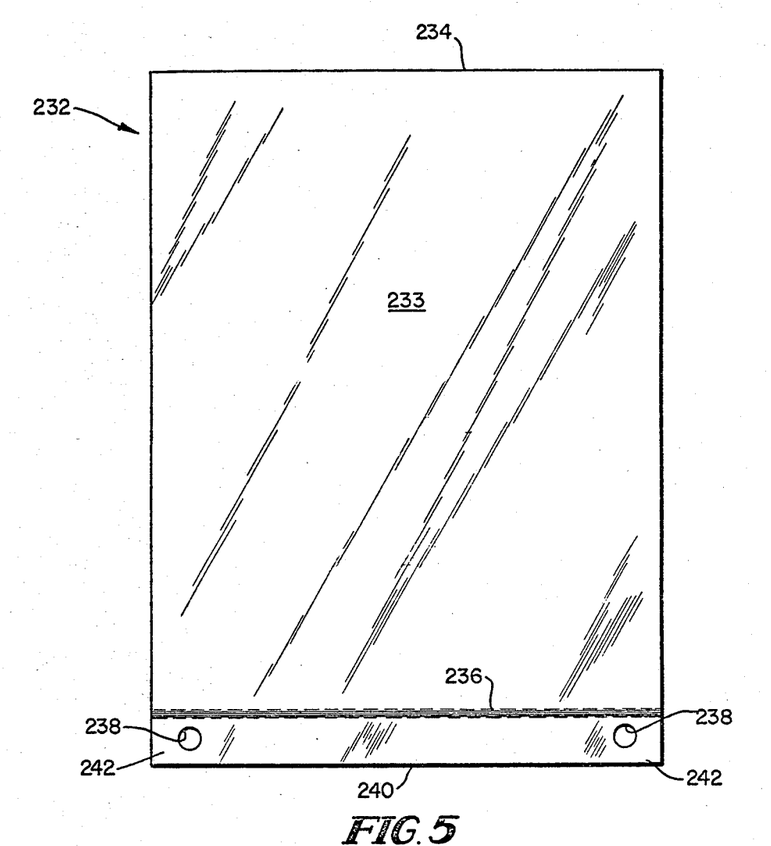
FIG. 5 is a side view of a second form of disposable cooking bag embodying the principles of the present invention.

Referring again to the drawing, FIG. 5 depicts a disposable cooking bag 232 also designed for use with utensils or accessories embodying the characteristics of accessory 126. Bag 232 is again of tubular construction with a side wall structure 233 and has an open, upper end 234 and a lower end closed by a seam 236. Spaced apart holes or apertures 238 are formed through a skirt 240 below seam 236.

Bag 232 is secured to an accessory such as 126 by stretching its closed end across the lower edge of the accessory base and then hooking the lower corners 242 of the bag over studs fixed to the attachment base, the latter extending through the holes 238 in skirt 240.

Figure 6:
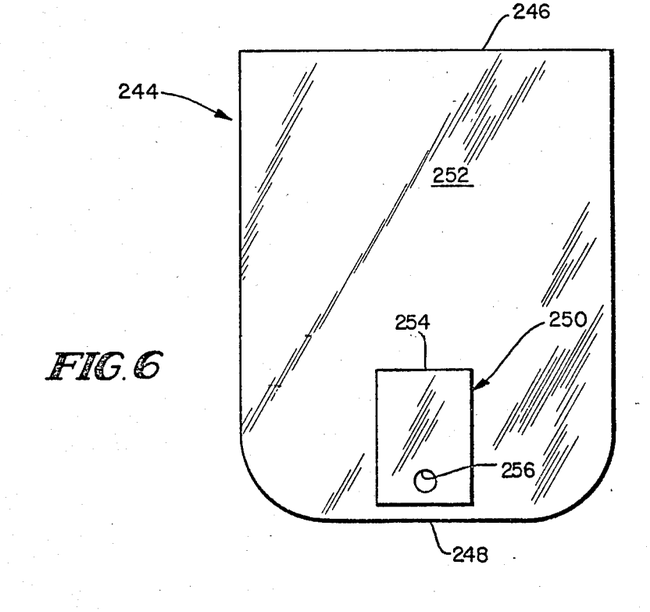
FIG. 6 is a side view of a third form of disposable cooking bag embodying the principles of the present invention.

FIG. 6 depicts yet another disposable cooking bag 244 intended for use with utensils or accessories equipped with outwardly projecting studs for securing the lower part of the bag in place. Also of tubular construction, bag 244 has an open upper end 246 and a closed lower end 248 of arcuate configuration.

Depending flaps 250 are hingedly attached to the side wall 252 of the bag at locations corresponding to the stud locations of the associated accessory or utensil as by heat sealing the upper edges 254 of the flaps to the bag.

Openings 256 are formed through flaps 250 toward the lower ends thereof.

Bag 244 is secured to the base of the accessory or utensil with which it is employed by disposing it in the base and then pulling the flaps upwardly over the lower edge of the base and hooking them over the outwardly projecting studs of the associated component, the latter extending through the apertures 256 in the flaps to secure the lower end of the bag in place.

Figure 7:
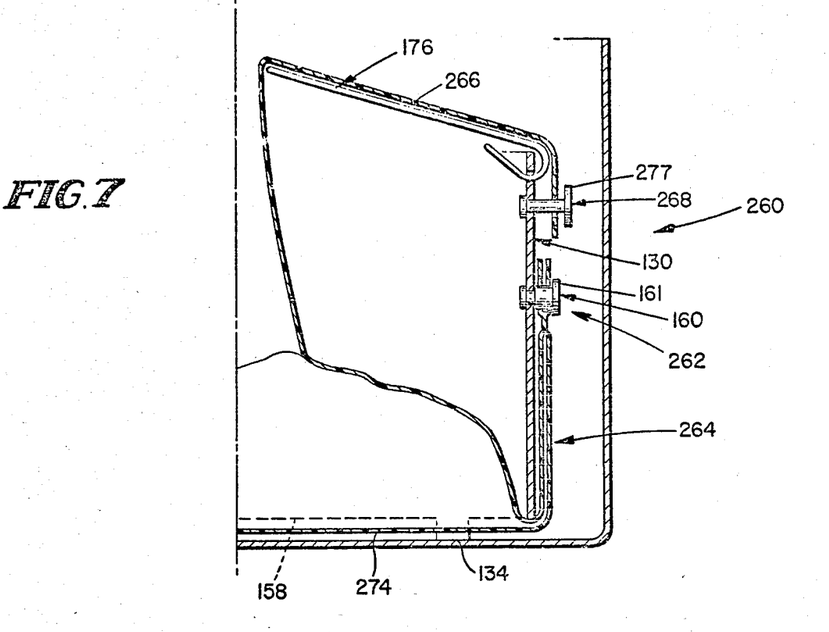
FIG. 7 is a vertical half section through a second form of cooking utensil and a fourth form of disposable cooking bag embodying the principles of the present invention, the upper end of the bag being closed.
Figure 8:
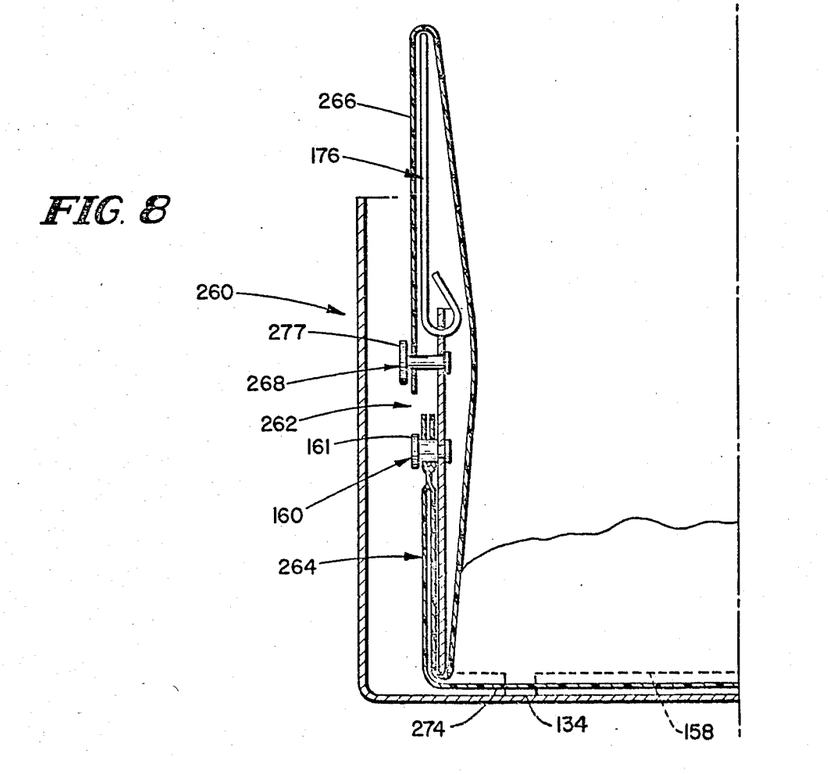
FIG. 8 is a view similar to FIG. 7 of the accessory and disposable bag shown in the latter figure, the upper end of the bag being open.

Referring still to the drawing, FIGS. 7 and 8 illustrate a conventional pan 260 equipped with an accessory 262 which gives the pan the capabilities for cooking comestibles in a disposable bag 264 embodying the principles of the present invention.

Accessory 260 resembles the accessory 126 illustrated in FIGS. 1-3 and described above. Accordingly, like reference characters have been employed in the drawing to identify like parts, and only those features of accessory 262 which distinguish it from the earlier described accessory are discussed below.

The major distinction between accessories 126 and 262 is that none of the elements pivotally attached to base 130 of the latter have clips, prongs, or other bag engageable fasteners at their inner ends. Instead, the upper part 266 of bag 264 is pulled down over elements 176 and secured in place by studs 268 projecting outwardly from base 130 at intervals therearound.

With the bag thus secured to base 130, the upper end of bag 264 will close when elements 176 are concomitantly rotated inwardly and downwardly to the position shown in FIG. 7 and be spread open when these elements are rotated upwardly and outwardly to the position shown in FIG. 8.

Figure 9:
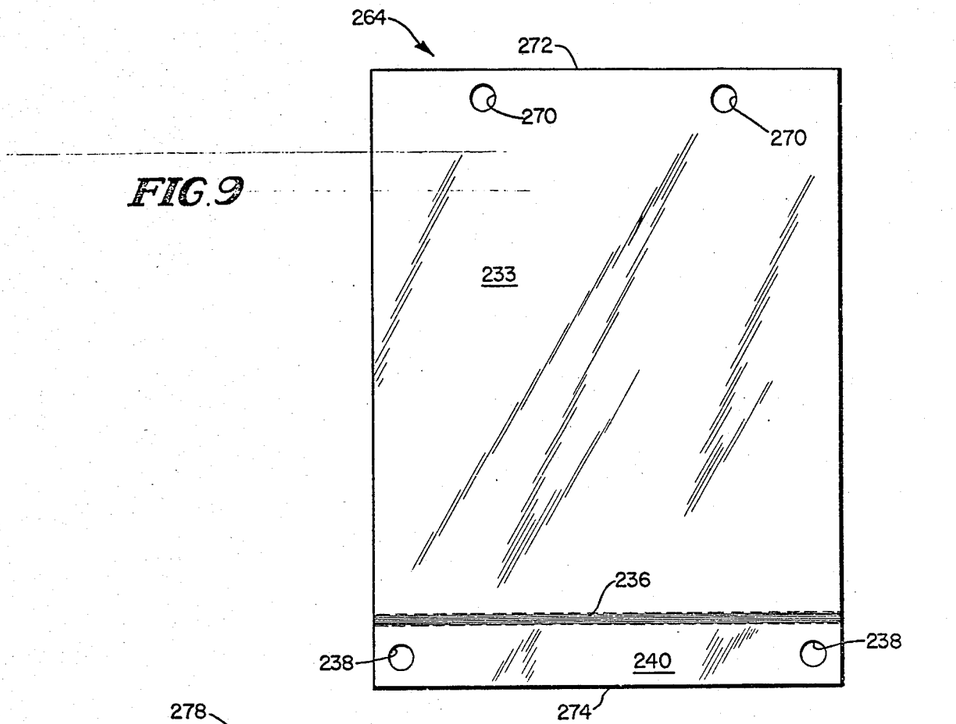
FIG. 9 is a side view of the disposable cooking bag.

Bag 264, shown in more detail in FIG. 9, is identical to the bag 232 shown in FIG. 5 except that apertures 270 are formed adjacent the upper edge 272 of the bag at intervals therearound which correspond to the locations of studs 268.

Bag 264 is assembled to accessory 262 in the much same manner that bag 232 is assembled to accessory 126. The lower, closed end 274 of the bag is first stretched across the lower edge 158 of base 130 and then pulled upwardly so that the corners of the bag can be hooked over studs 160, the studs extending through the apertures 238 in skirt 240.

Next, the upper part 266 of the bag is pulled down over bag supporting elements 176 and hooked over studs 268. The latter extend through the apertures 270 adjacent the upper edge 272 of the bag. Like studs 160, studs 268 have enlarged heads 277 to keep the bag in place.

Accessory 262 is described in more detail in copending application Ser. No. 702,002, hereby incorporated by reference, to which the reader may refer, if deemed necessary.

Figure 10:
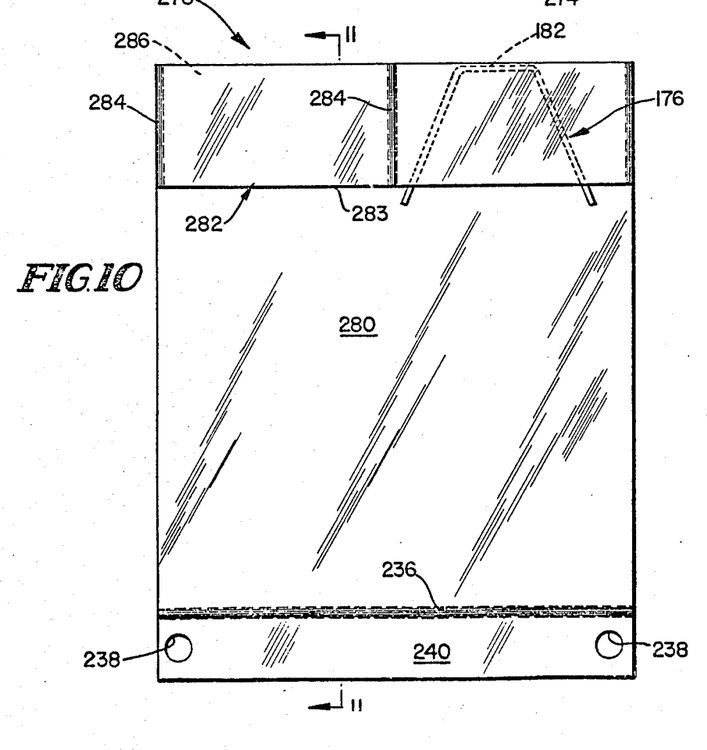
FIG. 10 is a side view of a fifth form of disposable cooking bag embodying the principles of the present invention.
Figure 11:
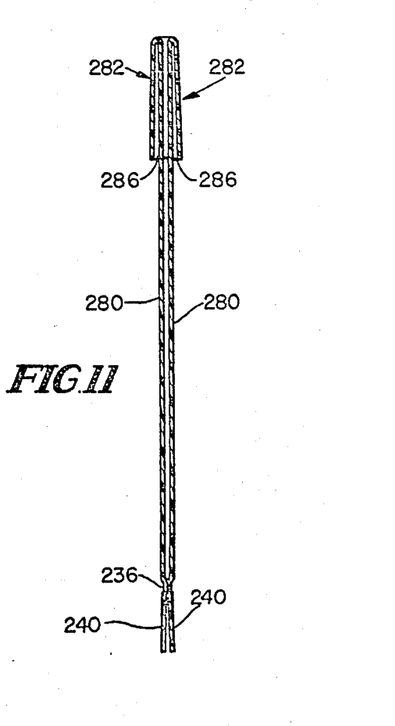
FIG. 11 is a section through the bag illustrated in FIG. 10 taken substantially along line 11—11 of the latter figure.

The studs 268 employed in accessory 262 to hold the upper end of the disposable bag in place can be eliminated by substituting for bag 264 one having pockets into which elements 176 can be inserted to provide a mechanical connection between the elements and the bag and thereby permit it to be opened and closed. A bag of this character is illustrated in FIGS. 10 and 11 and identified by reference character 278.

Disposable bag 278 of tubular or single fold construction differs from the disposable bag 264 shown in FIG. 9 primarily in that there are no holes in its upper edge. Instead, the upper part of the bag is folded down over the side 280 of the bag to form a cuff 282 having a free edge 283 facing the closed, lower end of the bag. Cuff 282 is sealed to side wall 280 by longitudinally extending seams 284 at intervals around the periphery of the bag to form pockets 286. The closed ends of the pockets face the upper, open end of the bag and the open ends face the lower, closed end of the bag, allowing the distal ends of the pivotable, bag-supporting elements to be inserted in the pockets as shown in FIG. 10. This forms mechanical connections between the elements and the bag equivalent to those produced if fasteners are used on the distal ends of the pivotable elements.

Bag 278 is attached to an accessory such as that shown in FIGS. 7 and 8 by rotating elements 176 to the upward and outward positions shown in FIG. 8. The bag is then pulled down through the base 130 of the accessory while guiding the inner ends of elements 176 into pockets 286. When the pivotable elements are bottomed in the pockets, the lower end of the bag is stretched across the bottom edge of base 130 and then pulled downwardly and hooked over studs 160.

Although generally less desirable it is possible in some cases to dispense with connections between the upper end of the disposable cooking bag and an accessory or untensil with pivotable members of the character shown in FIGS. 7 and 8. Instead, the upper end of a bag as shown in FIG. 9 or a similar bag without holes in the upper end is simply pulled down over the pivotable elements and left free.

Figure 12:
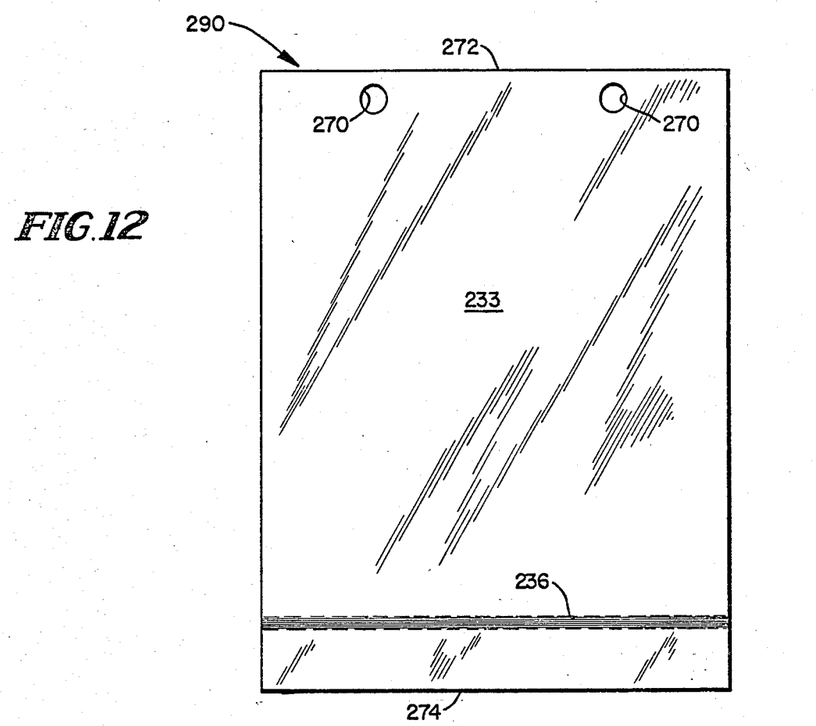
FIG. 12 is a side view of a sixth form of disposable cooking bag embodying the principles of the present invention.

Also, though again preferred in most cases, it is not in all circumstances essential that bags having lower ends which can be attached to the associated accessory or utensil be employed. A bag which does not is illustrated in FIG. 12 and identified by reference character 290. Bag 290 is essentially identical to the disposable bag 264 shown in FIG. 9 except that it has no holes in its lower skirt 240.

Bag 290 is intended for use with utensils or accessories which, like that shown in FIGS. 7 and 8, have studs to which the upper portion of the bag can be attached to secure the upper part of the bag in place. The weight of the comestibles disposed within the bag is relied upon to keep the lower end of the bag in place.

Figure 13:
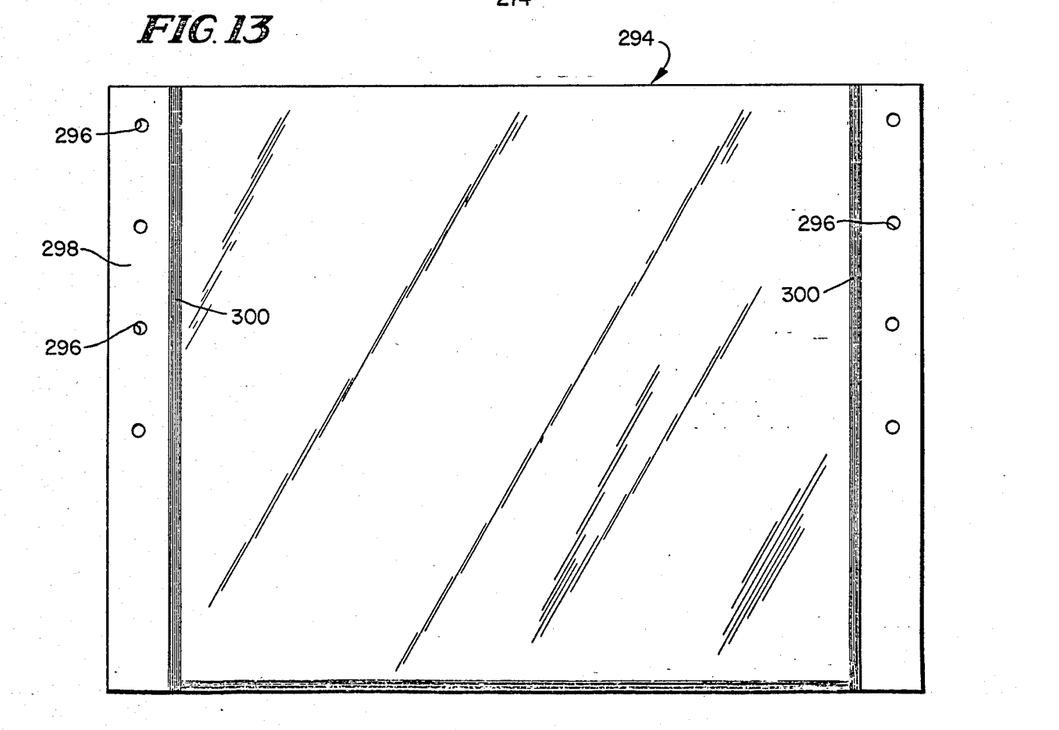
FIG. 13 is a side view of a prior art disposable cooking bag.

Disposable cooking bags as described and illustrated above and defined in the appended claims are quite different from the prior art disposable bags disclosed in the references identified above and the Sears "Meal In A Minute" bag illustrated in FIG. 13 and identified by reference character 294. For the most part, the previously disclosed cooking bags have no provision for attaching their lower, closed ends to the accessory or utensil with which they are associated. Nor is there any provision for so attaching the upper, open end of the bag to the accessory or utensil that it can be opened and closed by pivotable elements incorporated in the latter.

While bag 294 does have apertures 296 formed therein, these are located only in the upper part of the bag in skirts 298 beyond seams 300 making them useless for securing the lower part of the bag to a utensil or accessory in the manner described above.

I have illustrated in the drawing and described above a variety of disposable cooking bags in accord with the principles of the present invention. These particular embodiments were in part selected to show the features of my invention with a minimum of repetition. Therefore, while it has not in conjunction with each embodiment been so stated, it is to be understood that various ones of these features can be employed in the same bag and that such bags are fully intended to be covered by the appended claims. Also, bags adhering to the principles of the present invention will not necessarily resemble those shown in the drawing in appearance to any great extent. Consonant with the foregoing, the present embodiments of my invention are to be considered in all respects as illustrative and not restrictive, the scope of the invention being indicated by the appended claims rather than by the foregoing description; and all changes which come within the meaning and range of equivalents of the claims are therefore to be embraced therein.

What is claimed and desired to be secured by Letters Patent is:

1. The combination of a disposable bag for cooking comestibles and a cooking utensil or accessory, said utensil or accessory having a vertically extending bag-supporting means and said bag being made of a flexible material and having side walls and closable open and closed ends at the opposite ends of the side walls; said bag being disposed in said bag-supporting means with the open end uppermost and having means at the closed end thereof for effecting connections between the bag and the bag-supporting means, the means at the closed end of the bag being spaced at intervals around said bag and being so constructed as to be capable of producing mechanical connections between the closed end of the bag and the lower part of the bag-supporting means.

2. A combination as defined in claim 1, wherein said bag-supporting means comprises manually manipulatable means which is displaceable between first and second positions to respectively open, by spreading apart, and close, by collapsing, the open end of a bag as aforesaid and wherein the disposable cooking bag also has means adjacent and at intervals around the open end of the bag effecting connections between the open end of the bag and the bag-supporting means and making said open end of said bag openable and closable by said manually manipulatable means.

3. A combination as defined in claim 2, wherein the means for effecting connections between the open end of the bag and the bag-supporting means are openings through the side walls of the disposable bag.

4. The combination of a disposable bag for cooking comestibles and a cooking utensil or accessory, said utensil or accessory having a bag-supporting means and said bag being made of a flexible material and having side walls; spaced apart connecting means at the closed end of the bag which are adapted to be used to effect connections between the bag and a bag-supporting means associated therewith; and means adjacent and at intervals around the open end of the bag which are adapted to be used to effect connections between the bag and the bag-supporting means, said connecting means comprising pockets having closed ends facing the open end of the bag and open ends facing the closed end of the bag.

5. The combination of a disposable bag for cooking comestibles and a cooking utensil or accessory, said utensil or accessory having a vertically extending bag-supporting means and said bag being made of a flexible material and having a side wall and a closable open end at one end of the side wall, said bag being disposed in said bag-supporting means with its closable end uppermost and also having a seam between portions of the side wall at the opposite end thereof to form a closed end, a skirt extending downwardly beyond said seam, and openings through said skirt for effecting connections between the bag at the closed end thereof and the lower part of the bag-supporting means.

6. A combination as defined in claim 5, wherein said bag-supporting means comprises manually manipulatable means which is displaceable between first and second positions to respectively open, by spreading apart, and close, by collapsing, the open end of a bag as aforesaid, and wherein said disposable bag also has means adjacent and at intervals around the open end thereof which are adapted to be used to effect connections between the open end of the bag and the bag-supporting means and make said open end of said bag openable and closable by said manually manipulatable means.

7. A combination as defined in claim 6, wherein the means for effecting connections between the open end of the disposable bag and the bag-supporting means are openings through the side walls of the bag.

8. A combination as defined in claim 6, wherein the means for effecting connections between the open end of the disposable bag and the bag-supporting means are pockets incorporated in the bag, said pockets having closed ends facing the open end of the bag and open ends facing the closed end of the bag.

9. The combination of a disposable bag for cooking comestibles and a cooking utensil or accessory, said utensil or accessory having a vertically extending bag-supporting means and said bag being made of a flexible material and having side walls and closable open and closed ends at the opposite ends of the side walls, said bag being disposed in said bag-supporting means with its closable end uppermost and also having openings through the side walls at the opposite edges thereof and adjacent the closed end of the bag for effecting connections between the bag and the lower part of the bag-supporting means and seams between said side walls spaced from said openings toward the center of the bag and extending from end to end thereof to keep contents of the bag from leaking therefrom through said openings.

10. The combination of a disposable bag for cooking comestibles and a cooking utensil or accessory, said utensil or accessory having a vertically extending bag-supporting means and said bag being made of a flexible material and having side walls; closable open and closed ends at the opposite ends of the side walls; and means effecting connections between said bag and the bag-supporting means, said bag being disposed in said bag-supporting means with its closable end uppermost and the means effecting the connections between said bag and said bag-supporting means comprising flaps fixed to said bag at the closed end thereof and at intervals therearound, said flaps being trained around the lower end of and up the outside of said bag-supporting means and said connection effecting means also including means for fixing said flaps to the exterior of said bag-supporting means.

11. The combination of a disposable bag for cooking comestibles and a cooking utensil or accessory, said utensil or accessory having a vertically extending bag-supporting means comprising a manually manipulatable means which is displaceable between first and second positions to open, by spreading, and close, by collapsing, a bag as aforesaid; said bag being made of a flexible material and having side walls and closable open and closed ends at the opposite ends of the side walls; said bag being disposed in the bag-supporting means with its closable open end uppermost; said bag also including seams between said side walls and spaced from said side walls toward the center of the bag to keep the contents of the bag from leaking therethrough and openings through said side walls adjacent the closable open end of the bag and at intervals therearound for effecting connections between the open end of the bag and the upper part of the bag-supporting means, said openings being spaced inwardly of said seams; and said bag-supporting means having means which extend through said openings and cooperate with the bag to so fix said bag to the bag-supporting means that said closable end of said bag can be opened and closed by manipulation of the manually manipulatable means of the bag-supporting means.

12. The combination of a disposable bag for cooking comestibles and a cooking utensil or accessory, said utensil or accessory having a bag-supporting means and said bag being made of a flexible material and having side walls; open and closed ends at the opposite ends of the side walls; and pockets at the open end of the bag and at intervals therearound for effecting connections between the open end of the bag and the bag-supporting means, said pockets having closed ends facing the open end of the bag and open ends facing the closed end of the bag.

13. A combination as defined in claim 12, wherein said pockets are formed by a cuff integral with the side walls of the disposable bag, said cuff having a free edge extending around and facing the closed end of the bag and seams between said cuff and the portions of the side walls facing said cuff, said seams extending longitudinally of said bag.

14. The combination of a disposable bag for cooking comestibles and a cooking utensil or accessory, said utensil or accessory having a bag-supporting means and said bag being made of a flexible material and having side walls; open and closed ends at the opposite ends of the side walls; and spaced apart connecting means at the closed end of the bag for effecting connections between the bag and the bag-supporting means, at least one of said connecting means comprising pockets having closed ends facing the open end of the bag and open ends facing the closed end of the bag.

* * * * *